Jan. 9, 1923. 1,441,599
C. D. PLATT.
INCLOSED SWITCH.
FILED MAY 22, 1920. 2 SHEETS-SHEET 1
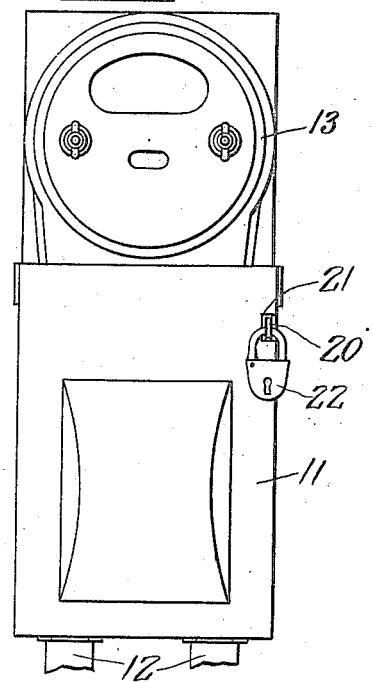
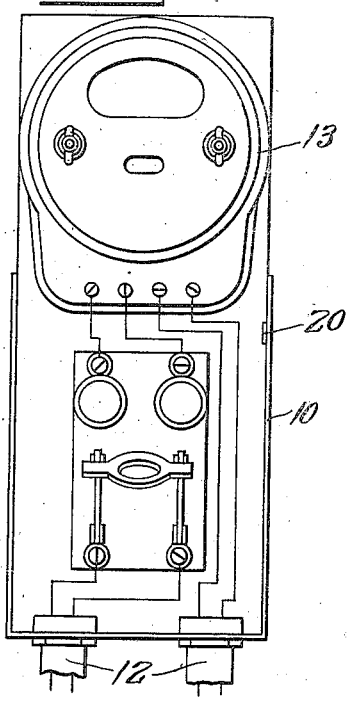
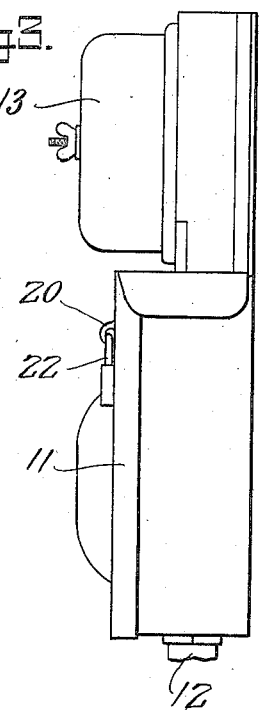
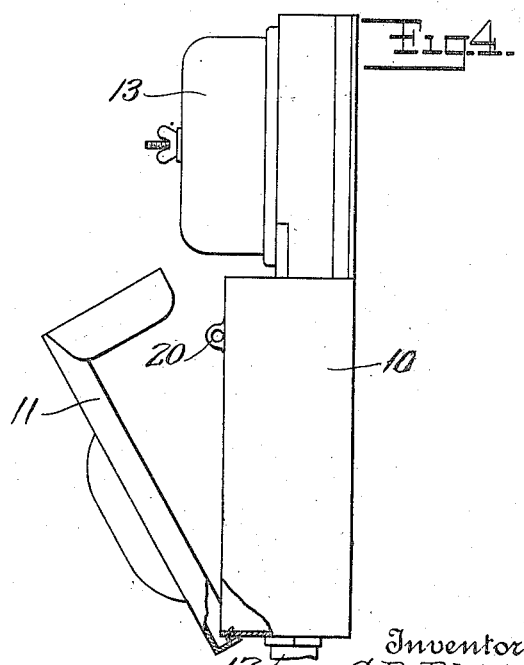
Inventor
C.D. Platt
By his Attorneys Jan. 9, 1923.
C. D. PLATT.
INCLOSED SWITCH.
FILED MAY 22, 1920.
1,441,599
2 SHEETS-SHEET 2
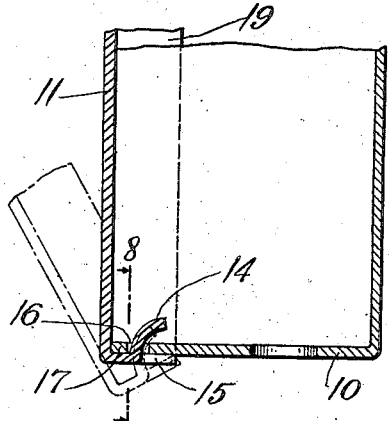
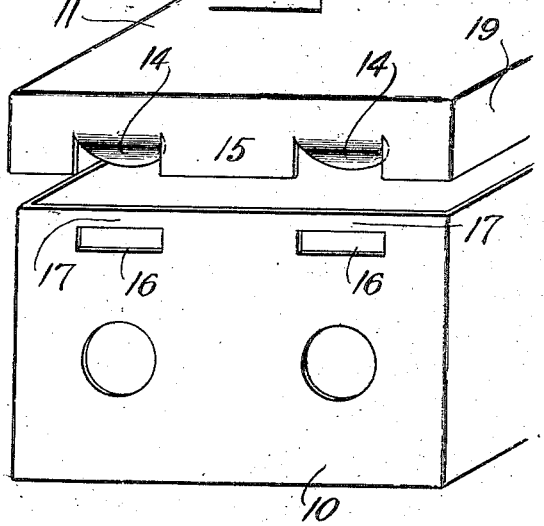
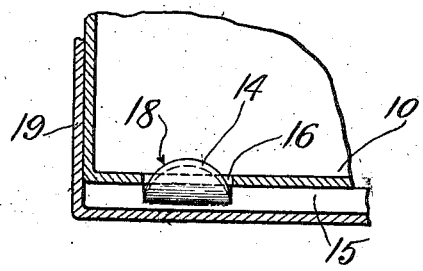
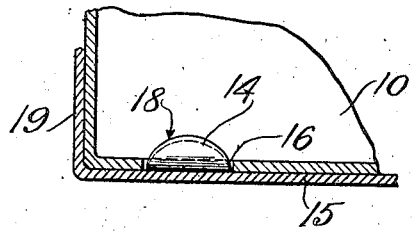
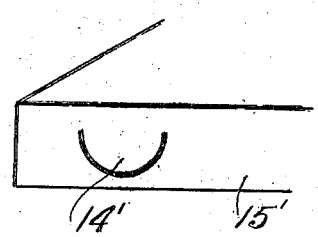

Patented Jan. 9, 1923.

1,441,599

UNITED STATES PATENT OFFICE.

CLARENCE D. PLATT, OF BRIDGEPORT, CONNECTICUT.

INCLOSED SWITCH.

Application filed May 22, 1920. Serial No. 383,385.

*To all whom it may concern:*

Be it known that I, CLARENCE D. PLATT, a citizen of the United States of America, residing at Bridgeport, Connecticut, have invented a new and useful Inclosed Switch, of which the following is a specification.

The wiring in modern systems is commonly protected in conduits, the ends of which are secured to the switch box. To facilitate the installation of the wiring of the boxes, it is desirable that the cover of the box be removable.

The main object of my invention is to provide a simple and inexpensive construction for detachably securing the cover to the body of the box so that the cover may be readily placed in position even though the workman is unable to see the box clearly.

Fig. 1 is a front view of a construction embodying the improvements of my invention.

Fig. 2 is a front view with the cover removed.

Fig. 3 is a side view with the cover in place.

Fig. 4 is a side view with part of the hinge connection shown in section with the cover in the act of being attached or detached.

Fig. 5 is a fragmentary vertical sectional view on a larger scale showing the hinge connection, and in dot and dash lines showing the cover being attached.

Fig. 6 is a fragmentary perspective view showing the body and cover of the box separated.

Fig. 7 is a fragmentary view on the plane of the line 8—8 of Fig. 5 showing the relative position of the parts when assembling the cover on the body of the box.

Fig. 8 is a similar sectional view with the cover in place.

Fig. 9 is a perspective view of a fragment of the cover with a modified detail of construction.

It should be understood that the invention is susceptible of embodiment in various forms of inclosed switch constructions. In the form shown, the box consists of the body 10 and the cover 11. The circuit wires pass into and out of the box through one or more conduits such as 12. I have shown the box associated with a meter 13 although obviously the invention is not limited to this construction.

To afford a detachable hinge-like connection between one edge of a cover and the body of the box, I provide two curved tongues such as 14, which are cut from the flange 15 of the cover and bent inwardly, the arc preferably having its center approximately at the edge of the flange 15. The body of the box is provided with correspondingly located slots or passages 16 leaving connecting bars 17. Preferably the ends of the tongues 14 are rounded or tapered as at 18 so as to facilitate their entrance into the slots 16. To attach the cover, it is simply necessary to hold it in the position shown in Fig. 4 and hook the tongues 14 into slots 16 and push the cover upwardly and backwardly into position. By providing the cover with side flanges 19, it is possible for the workman to more readily locate the cover and its tongues in the proper position relative to the body of the box and the slots 16 for the purpose of attachment.

In the form shown in Figs. 4 to 6, the tongues 14 are cut from the edges of the flange 15, but they may be as shown at 14' in Fig. 9 where the flange 15' is continuous at its edge.

Suitable means may be provided for holding the cover in the position in Figs. 1 and 3, such for instance as a bar 20 secured to the side of the body of the box and adapted to project through an opening 21 in the cover and receive a fastening device such as a padlock 22. Obviously, this part 20 may have frictional engagement with the cover so as to hold the cover yieldingly in place.

With this construction the cover may be removed, the apparatus installed with the greatest ease, and the cover then readily attached. When the cover is removed, obviously, the workman has entire freedom of action in operating the switch, examining the meter, replacing fuses, and adjusting or inspecting the conduit connections if necessary. By reason of the curved bends and the rounded ends of the tongues the cover is automatically drawn into close-fitting engagement with the box in the act of assembly.

I claim:

1. In an inclosed switch, a sheet-metal switch box body having slots in one side near the edge and a flanged cover having curved hinge tongues adapted to enter said slots and draw said cover into accurately positioned engagement laterally and vertically with said box body, the center of curvature of each tongue being approximately at the edge of the flange of the cover.

2. In an inclosed switch, a rectangular sheet-metal box body having a pair of spaced slots in one side and adjacent the edge, a cover for said box body, having depending flanges extending below the slots to embrace the box and to position the cover thereon, and a pair of spaced tongues on a flange of the cover adapted to pass within the slots in the body to secure the cover and body together, said tongues being tapered to facilitate passage into the slots and having their free ends extending below the slots in the side of the box when the cover is closed in position to reenforce the side of the box adjacent the slots.

3. In an inclosed switch, a sheet-metal switch box having a plurality of slots in one side, a cover for the box and provided with flanges overlapping the box and extending below the slots, and a plurality of tongues on one of the flanges on the cover and adapted to enter said slots to act as hinges and to retain the cover in place, said tongues being longitudinally curved and the free ends thereof extending below the said slots in the side of the box when the cover is closed, to increase the security of the connection between the cover and box formed by the tongues and slots.

4. In an inclosed switch, a sheet-metal switch box body having one side provided with a number of long narrow slots, and a sheet-metal cover having a depending flange portion provided with inwardly extending tongues to cooperate with said slots in securing said cover to said body, the width of said slots being just sufficient to afford clearance to said tongues, to prevent translational relative movement between said cover and body, and said tongues being curved in an arc about the edge of the flange as a center whereby the cover may be attached to the body by a purely rotary movement relative thereto about the edge of the flange as a center.

5. In an inclosed switch, a rectangular sheet-metal box body having side walls and an end wall, said end wall being provided with a number of aligned slots near the edge thereof and parallel thereto, and a sheet-metal cover having side flanges and an end flange to overlie said body walls respectively and cooperate therewith in positioning the cover on the box, said end flange being provided with hinge tongues extending inwardly and away from the top of said cover, said tongues being adapted to enter said slots during the assembly of the cover on the box and when the cover is in closed position substantially filling said slots and overlapping the lower edges of the slots to prevent forcing inward of the end wall of the body.

CLARENCE D. PLATT.